Feb. 25, 1930. W. W. HOLCOMB 1,748,128
BENCH TOOL FOR REPAIRING CHAINS
Filed Nov. 6, 1926
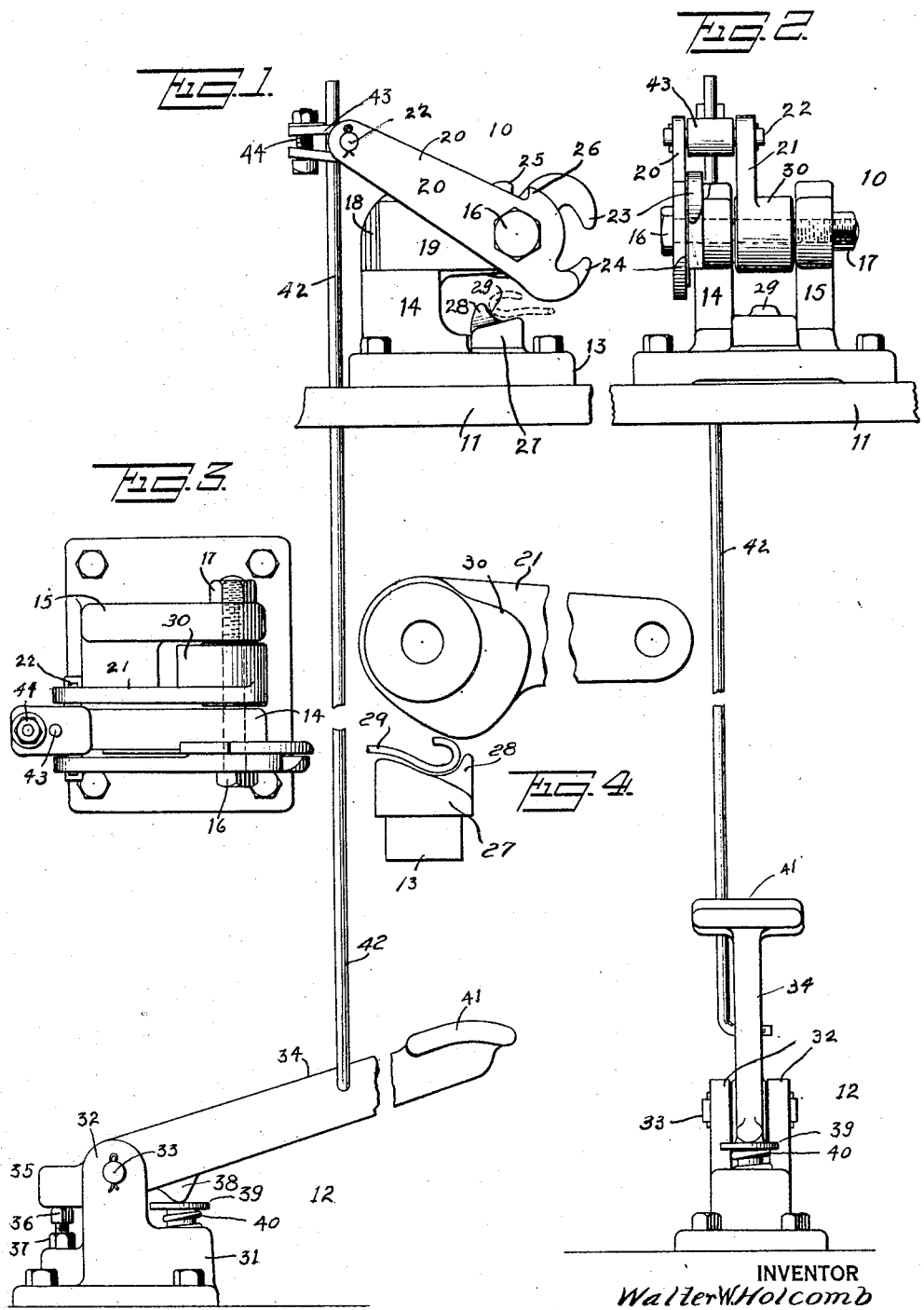
INVENTOR
Walter W. Holcomb
BY
ATTORNEY Patented Feb. 25, 1930

1,748,128

UNITED STATES PATENT OFFICE

WALTER W. HOLCOMB, OF CHICOPEE FALLS, MASSACHUSETTS, ASSIGNOR TO AMERICAN CHAIN COMPANY, INC., A CORPORATION OF NEW YORK

BENCH TOOL FOR REPAIRING CHAINS

Application filed November 6, 1926. Serial No. 146,593.

My invention relates to apparatus for repairing chains, and is particularly adapted for embodiment in a bench outfit for repairing tire chains. Tire chains usually consist of a pair of side chains or longitudinal chain members connected at intervals by cross chains or transverse chain members. In service the latter run across the tread of a vehicle wheel and are subjected to considerable wear while the side chains serve merely to hold the cross chains in place and are subject to comparatively little wear. Repairs to tire chains are thus almost wholly confined to the cross chains and my invention has for an object to provide a bench outfit that is especially adapted for repairing the cross chain members of a tire chain.

Another important object of my invention is to provide an improved tool for closing the links of a chain.

A further object of my invention is to provide a convenient bench repair outfit having link-opening and link-closing mechanisms adapted to be operated by foot power to perform the operations necessary for repairing the cross chain members of a tire chain.

With these and other objects in view my invention consists in certain novel features of construction and combinations and arrangements of parts, which will be more fully hereinafter described and pointed out in the claims.

In the accompanying drawings,

Fig. 1 is a side elevation of my improved tool;

Fig. 2 is a front elevation of the same; and

Fig. 3 is a top plan view of my improved tool.

Fig. 4 is a fragmentary detail view of the link-closing mechanism, shown separately.

My improved bench apparatus for repairing tire chains preferably comprises link-closing mechanism, and link-opening mechanism, associated upon a suitable bench or other support of which a portion is indicated at 11, and these mechanisms will be described in their associated relation, although it is to be understood that the improved closing mechanism is susceptible for use apart from the opening mechanism and is so claimed.

In the now preferred embodiment, illustrated, the mechanisms are combined in a tool head mounted on the bench or support 11, and having a base 13 from which rise two standards 14 and 15. The latter have forward extensions which are apertured to receive a bolt 16. The aperture in the standard 15 is threaded to engage the thread of the bolt 16 and a nut 17 serves to lock the bolt at the desired adjustment with respect to the standards 14 and 15. The standard 14, on the outer side thereof, i. e., the side remote from the standard 15, is formed with a recess 18 in which is seated a fixed jaw 19, constituting one member of the link-opening mechanism, which will be first described briefly, as the link-opening operation ordinarily comes first in order in the repair of a tire chain, for the purpose of removing a worn-out cross chain, or one or more links thereof.

Bearing against the outer face of the fixed jaw 19, is a jaw lever 20, which is mounted to turn on bolt 16 which passes through the jaw 19. The fixed jaw 19 is provided at its forward end with a downwardly turned hook 23 and the movable jaw 20 is provided at its forward end with an upwardly turned hook 24. The contacting faces of the hooks are flat, but the outer faces taper inwardly at the point of the hooks, so that points of the hooks 23 and 24 may be introduced into the eye of a cross-chain link. However the combined thickness of the untapered or body portions of the hooks 23 and 24 is considerably greater than the opening in the chain link, so that by forcing the hooks into the link, the latter will be wedged open by the tapered ends of the hooks. On the upper face of the fixed jaw 19 there is a forwardly-disposed shoulder 25 and on the movable jaw 20 there is a rearwardly disposed shoulder 26. These shoulders may be provided if desired with sharp corners at the adjacent faces of the two jaws which corners serve as shears to cut the chain links whenever desired.

In pursuance of an important object of the invention I provide an improved link-closing mechanism which in its now preferred form includes a cam lever 21 mounted to turn on the bolt 16 between the brackets 14 and 15. The cam lever 21 is shown as extending rearwardly and connected by a transverse pin 22 with the jaw-lever 20, which also extends rearwardly.

To support a chain link in position to be closed by the cam-lever 21, I provide an anvil 27, which is supported on the base 13 between the brackets 14 and 15. The cam lever 21 is provided with an eccentric hub 30, so that when an open link, such as indicated by broken lines at 29 in Figs. 1 and 2 is laid on the anvil, and the lever 21 is turned on its axis 16, the eccentric hub or cam 30 will wipe over the end of the link and force it down to closed position. This novel wiping action for closing an open link proceeds of extension of the free end of the open strand, as indicated in Fig. 4, and permits a closing operation, which requires considerable power, to be performed quickly and accurately, for the operator can sweep the cam to the desired extent, and the sweeping movement can be more readily gauged and controlled than the conventional squashing movement of a press, as used in existing closing devices.

The anvil 27 is provided with a horn 28 adapted to enter the closed link next to the open link which is being operated upon, and the horn 28 is curved to fit the adjacent portions of both links.

To operate levers 20 and 21 I prefer to provide suitable manually actuated means, such as the treadle mechanism 12. This treadle mechanism comprises a base 31, which may be bolted or otherwise secured to the floor, and is formed with a pair of upwardly-projecting arms 32 which provide bearings for a pin 33 on which is fulcrumed a treadle lever 34. The lever 34 has a short rearwardly projecting arm 35 which is adapted to bear against a stop member 36. The stop member consists of a set screw which is threaded into the base 31 and secured at a desired adjustment by means of a lock nut 37. Immediately in front of the fulcrum 33, the lever 34 is provided with a boss 38 projecting from the lower face thereof, and adapted to engage a plunger 39, movable in a socket formed in the base 31. A spring 40 serves to press the plunger upward, forcing the treadle lever to the position in Fig. 1 with the arm 35 engaging the stop 36. At the forward end of the lever 34 there is a foot piece or step 41.

The treadle lever 34 is connected to the jaw lever 20 and cam lever 21 by means of a rod 42, which passes through apertures in a U-shaped clamp 43. The latter is bent around the pin 22 and the outer ends of the clamp are drawn together by means of a bolt 44. As the bolt 44 is tightened the clamp 43 bites into the rod 42 and thus connects the rod to the pin 22 carried by the levers 20 and 21. By means of the clamp 43 the position of the levers 20 and 21 with respect to the treadle 34 may be adjusted at will.

The operation of the apparatus will be readily understood. On depressing the treadle 34 both the jaw lever 20 and the cam lever 21 will be turned on their axis 16, the hook 24 moving toward the hook 23 and the swell of cam 30 moving toward the anvil 27. A chain link may be opened by holding it in position to receive the jaws 23 and 24, and then depressing the treadle lever to cause the hooks 23 and 24 to co-act and wedge open the link. An open chain link may be closed by positioning it on the anvil 27 and then operating the treadle 34, to cause the cam 30 to wipe against and close the open end of the link. During this operation the horn 28 may hold another link through which the open link is inserted. When so desired, a chain link may be cut by inserting it between shoulders 25 and 26, the cutting being effected by the shearing movement of shoulder 26 with respect to shoulder 25 when the treadle is depressed.

Thus I provide a simple treadle-operated bench outfit for performing all necessary repair operations on a chain.

Having thus described my invention and with the understanding that various changes and modifications can be made without departing from the spirit and scope of my invention, I claim:

1. A tool for closing an open chain link, comprising an anvil adapted to support said link, a cam journaled adjacent said anvil, and means for operating the cam to wipe against the free end of the open strand of said link and force said link to closed position, said wiping action proceeding in the direction of extension of said free end.

2. A tool for opening and closing a chain link, comprising a support provided with an anvil adapted to support said link, and a lever journaled adjacent the anvil, said lever and support having co-operating jaws adapted to be approached toward each other to engage the same loop portion of a link to open the loop, and said lever being formed with an eccentric hub adapted to wipe against and force said link to closed position.

3. In a tool for operating upon chain links, an anvil adapted to support an open chain link, a cam lever formed with an eccentric hub adapted to wipe against and close the open link on the anvil, a treadle lever, a rod connected thereto, a clamp connecting said rod to the cam lever, and an adjustable stop for said treadle lever, and a spring pressing the treadle lever against said stop and holding said cam-lever normally in relatively open position.

In witness whereof, I have signed this specification.

WALTER W. HOLCOMB.